Feb. 16, 1932.   H. W. PRICE   1,845,812
PISTON GASKET AND EXPANDING RING
Filed April 28, 1928
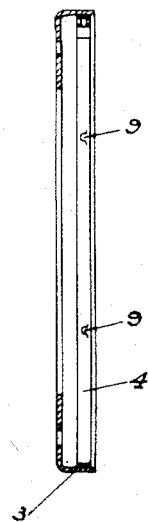
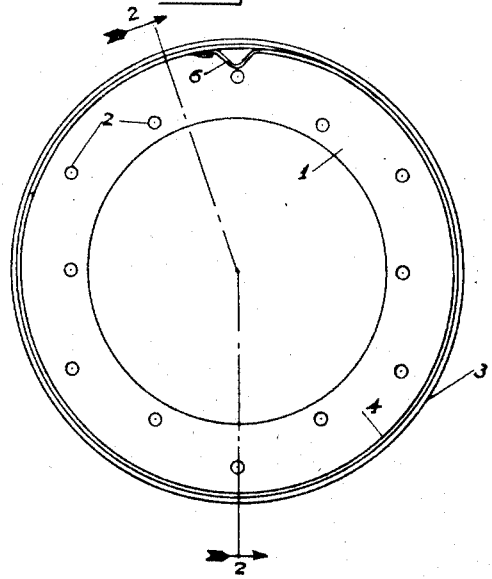
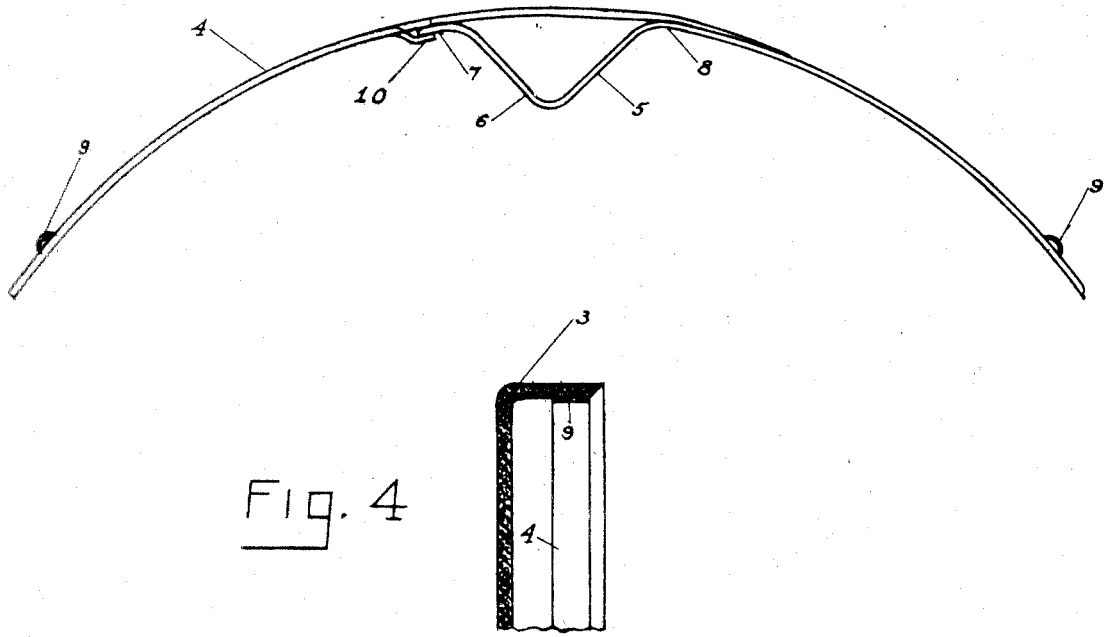
INVENTOR
HAROLD W. PRICE
BY John F. Ryan
ATTORNEY Patented Feb. 16, 1932

1,845,812

UNITED STATES PATENT OFFICE

HAROLD W. PRICE, OF ELMHURST, NEW YORK, ASSIGNOR TO BRAGG-KLIESRATH CORPORATION, OF LONG ISLAND CITY, NEW YORK, A CORPORATION OF NEW YORK

PISTON GASKET AND EXPANDING RING

Application filed April 28, 1928. Serial No. 273,468.

My invention consists in the novel features hereinafter described, reference being had to the accompanying drawings which illustrate the form in which I have contemplated embodying the invention selected by me for the purposes of illustration, and the said invention is fully disclosed in the following description and claims.

The pistons of power actuators forming part of vacuum brake mechanisms or other piston-cylinder devices where a differential of pressures is maintained on both sides of the piston, are usually provided with gaskets or packings of yielding or flexible or elastic material such as rubber, wood fibre or leather. Rubber packings are unsatisfactory because of the injurious effect which oil produces therein. Leather is difficult to shape into a perfect fit and difficult to maintain in contact will all parts of the cylinder walls. I have produced a piston gasket formed of wood fibre material which may be procured in large sheets, is comparatively inexpensive and is not injuriously affected by oil or gasoline. This material has not sufficient elasticity to exert a constant pressure against the cylinder walls and therefore the gasket must be equipped with an internal expanding spring to press the skirt against the cylinder walls with sufficient pressure to prevent the passage of the fluid contained in the cylinder from one side of the piston to the other. On the other hand, the spring member must not exert so great a pressure against the cylinder walls as to cause undue wear.

In carrying out my invention, I form a gasket with an annular flange portion or skirt for engaging the cylinder walls, the inner face of the flange or skirt being provided with an annular elastic or yielding expanding device constructed to press outwardly against the flange at every point around the same with substantially equal pressure, so as to hold the flange at all times and throughout its entire extent, and with uniform pressure against the cylinder walls to insure a fluid tight joint at all times regardless of the longitudinal movements of the piston in the cylinder.

In the accompanying drawings,

Fig. 1 represents a plan view of the gasket with the expanding ring in place.

Fig. 2 represents a sectional view of the same taken through 2—2 of Fig. 1.

Fig. 3 is an enlarged detail view of the expanding device.

Fig. 4 is an enlarged detail view of a section through the gasket.

In Fig. 1, 1 represents the annular attaching portion of the gasket adapted to be clamped between opposing faces of the piston provided in this instance with a plurality of apertures indicated at 2, through which the clamping bolts uniting the clamping portions of the piston may extend to secure the gasket in place in the piston. The annular attaching portion is provided at its outer edge with a substantially right angular flange or skirt portion, 3, adapted to engage the cylinder wall.

The inside of the flange or skirt is provided with a spring expanding member which may be made of flat spring material. A spring is formed by bending a terminal portion of the expanding member in toward the axis of the ring as shown at 5, (Fig. 3), and then outward toward the circumference again, as shown at 6. End, 7, of member, 4, may be formed so that it may be held by lip, 10, which may conveniently be produced by pressing it outward from the main body of the expanding member, 4. When the expanding member, 4, is placed in the piston gasket, 1, portions 5 and 6 are pressed toward each other so that after the member, 4, is positioned, there is a tendency for members, 6 and 5 to spring apart and thus tend to separate points, 7 and 8. This spring action is transmitted around the whole circumference of the expanding member and produces an outward thrust on the flange, 3, at all points of its circumference so as to force flange, 3, into contact with the cylinder walls.

Engaging members, 9, may be pressed out of the body of expanding member, 4, at various points around the circumference in a direction away from the axis of the ring. The expanding action of the ring forces these projecting engaging members into the material of the gasket far enough to hold the spring ring in place in the gasket so that the ring may not move longitudinally relative to the gasket while in operation, but on the other hand, may be easily applied and removed. As shown in Fig. 4, members, 9, are not long enough to pass through the gasket flange or skirt, 3, so there is no danger of them scoring the cylinder walls while in operation.

These expanding rings are light, take up little space, are in one piece, and may be easily and cheaply manufactured by a bending operation and an upsetting operation. There are no loose parts to come loose and damage the inside of the cylinder.

What I claim and desire to secure by Letters Patent is:—

1. In an expanding ring, a substantially circular body portion of resilient material, overlapping terminal portions, means upon one terminal portion for engaging the outer end of the other terminal portion and a spring portion bent inwardly toward the axis of said ring and adapted to expand said ring by relative movement between the ends of the spring portion after initial compression to place said ring in operable position.

2. In an expanding ring adapted to be used in conjunction with a piston gasket, a body portion of resilient material adapted to be bent into substantially circular form, overlapping terminal portions on said body portion, means for connecting the outer end of one terminal portion to the inner end of the other terminal portion to prevent relative movement between the said respective ends thereof, and spring means adapted to permit application of the ring in operable position and when so positioned to tend to expand said ring against its piston gasket.

3. A piston gasket expanding ring of flat spring metal made in one piece and comprising a body portion adapted to engage the inside of the piston gasket, overlapping terminal portions adapted to be connected and a spring portion integral with and offset from said body portion toward the axis of the ring so that the ends thereof may move relatively to each other to cause expansion and contraction of said ring.

4. In an expanding ring, a body portion of resilient material, overlapping terminal portions, means for detachably connecting said terminal portions to prevent relative movement between the free ends thereof while the ring is in operable position, and a spring formed by bending one of said terminal portions out of line with said body portion so that the ends of said spring containing terminal portion may move relatively to each other when said ring is in operable position and thus provide for compression and expansion of said ring.

5. In combination, a gasket provided with a flexible skirt portion, an expanding ring of spring metal having overlapping connected end portions, a resilient bent portion to permit the compression of the ring for application to said gasket and means adapted to be embedded in said gasket by the normal expanding action of said ring for holding said gasket and said ring against relative axial displacement.

6. An expanding ring provided with overlapping terminal portions parts of which are capable of longitudinal movement relative to each other, said ring being provided with an integral spring member formed in one piece with one of said overlapping terminal portions, and means adapted to hold the outer end of said spring containing terminal portion immovable with respect to the inner end of said other terminal portion.

In testimony whereof I have hereunto set my hand.

HAROLD W. PRICE.